United States Patent [19]
Larkins et al.

[11] Patent Number: 6,091,957
[45] Date of Patent: *Jul. 18, 2000

[54] SYSTEM AND METHOD FOR PROVIDING A GEOGRAPHIC LOCATION OF A MOBILE TELECOMMUNICATIONS UNIT

[75] Inventors: John Pruett Larkins; Gary Boyd Stephens, both of Allen, Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/874,061

[22] Filed: Jun. 12, 1997

[51] Int. Cl.[7] .............................. H04Q 7/20; G01S 3/02
[52] U.S. Cl. .................. 455/456; 455/457; 342/457.1
[58] Field of Search ................................. 455/456, 457, 455/445; 379/201; 342/457.1

[56] References Cited

U.S. PATENT DOCUMENTS

| | | |
|---|---|---|
| 5,293,642 | 3/1994 | Lo . |
| 5,327,144 | 7/1994 | Stilp et al. ............................. 455/456 |
| 5,341,410 | 8/1994 | Aron et al. ............................. 455/410 |
| 5,363,425 | 11/1994 | Mufti et al. . |
| 5,432,841 | 7/1995 | Rimer .................................. 455/457 |
| 5,485,163 | 1/1996 | Singer et al. ........................ 342/457 |
| 5,515,426 | 5/1996 | Yacenda et al. ..................... 379/201 |
| 5,539,810 | 7/1996 | Kennedy, III et al. ............... 455/456 |
| 5,544,225 | 8/1996 | Kennedy, III et al. ............... 455/456 |
| 5,550,907 | 8/1996 | Carlsen ................................ 455/456 |
| 5,594,425 | 1/1997 | Ladner et al. ................... 340/825.06 |
| 5,625,668 | 4/1997 | Loomis et al. ....................... 455/456 |
| 5,629,693 | 5/1997 | Janky .................................. 455/456 |
| 5,642,398 | 6/1997 | Tiedemann, Jr. et al. ........... 455/426 |
| 5,652,570 | 7/1997 | Lepkofker .......................... 455/521 |
| 5,712,899 | 1/1998 | Pace, II .............................. 340/988 |
| 5,727,057 | 3/1998 | Emery et al. ....................... 455/456 |
| 5,732,354 | 3/1998 | MacDonald . |
| 5,771,455 | 6/1998 | Kennedy, III et al. ............... 455/456 |
| 5,960,341 | 9/1999 | LeBlanc et al. ..................... 455/426 |
| 5,960,356 | 9/1999 | Alperovich et al. ................. 455/458 |

FOREIGN PATENT DOCUMENTS

| | | | |
|---|---|---|---|
| H08-065413 | 3/1996 | Japan ....................... | H04M 11/02 |
| H09-008935 | 1/1997 | Japan ....................... | H04M 11/00 |

*Primary Examiner*—Reinhard J. Eisenzopf
*Assistant Examiner*—Charles N. Appiah
*Attorney, Agent, or Firm*—Haynes & Boone, L.L.P.

[57] ABSTRACT

A system and method is described herein which provides an originating telecommunications unit with the geographic location of a mobile telecommunications unit without actually placing a call to, or receiving a call from, the mobile unit. The originating unit provides a service platform with an authorization code and the telephone number, or other identification, of the mobile unit to be located. The service platform then initiates a location program which uses various geographic location methods to provide the originating unit with the location of the mobile unit, without the user of the mobile unit becoming aware that the location of the mobile unit is being determined.

7 Claims, 1 Drawing Sheet

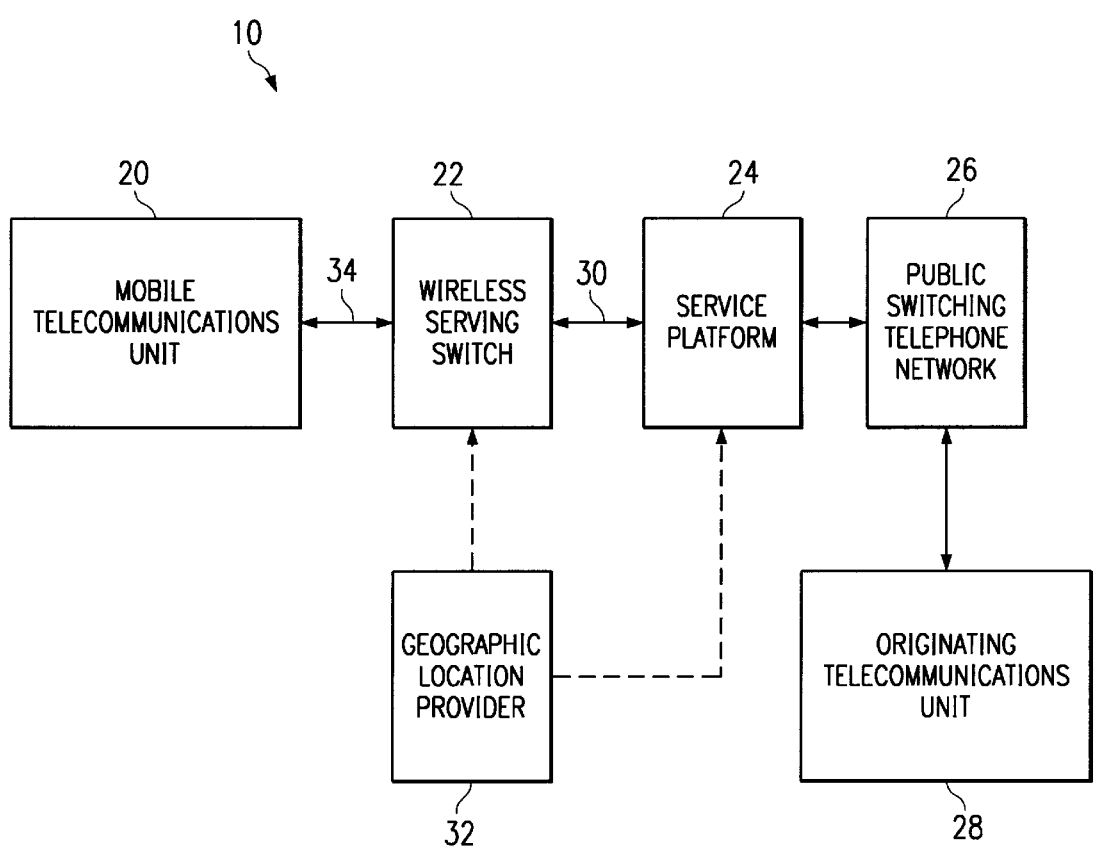

SYSTEM AND METHOD FOR PROVIDING A GEOGRAPHIC LOCATION OF A MOBILE TELECOMMUNICATIONS UNIT

FIELD OF THE INVENTION

This invention relates to a system and method for providing an authorized person having a telecommunications unit with the geographic location of a mobile telecommunications unit.

TECHNICAL FIELD

Currently, to determine a mobile unit's location, the cell location of the mobile unit can be determined using known methods, but only if the mobile unit is transmitting, i.e. only if a call has been placed by or to the mobile unit. It is advantageous and desired that a user of a telecommunications device, such as a wireless telephone, a land-based telephone, or a land-wired telecommunications device such as a personal computer, determine continuously in real-time the geographic position of a mobile telecommunication unit without a call actually being placed to or by the mobile unit.

In such a situation, the mobile unit is typically a wireless mobile telephone, but may be a computer or any other device capable of communicating via wireless protocol. For example, a parent may desire the location of his/her child by determining the location of the child's mobile phone which, hopefully, is with the child. The system and method of the present invention would allow the location of the mobile unit to be determined automatically, or without requiring intervention, as long as the mobile unit is powered-on.

SUMMARY OF THE INVENTION

This invention is for a system and method of providing an originating telecommunications unit, i.e., the unit initiating the telecommunications message or telephone call, with the geographic location of a mobile telecommunications unit without a call being placed from the originating unit to the mobile unit, or vice versa. An originating telecommunications unit places a call to a special number to activate the geographic location function. An authentication code is provided by the originating unit user. The mobile unit to be located is identified by the originating unit user. The originating unit is then provided with the geographic location of the mobile unit via a recorded message from a service platform or via data transmitted to the terminal of the originating unit. The originating unit user may then request a location update from the system, or may terminate the location request by hanging up.

The geographic location of the mobile unit is determined from geographic information provided to the service platform from a spacebased GPS-type satellite platform, from a device performing triangulation calculations, from a device which performs distance delay calculations, or from a transceiver from a mobile cell which determines the strongest signal from the mobile unit among a plurality of cells. Other suitable means may also be employed.

The invention has many uses, such as a wireless tracking device utilizing a wireless mobile unit as the tracked device. As long as the mobile unit is powered-on, the geographic location of the mobile unit can be determined by any of the aforementioned methods. In this way, an originating telecommunications unit can receive information concerning the geographic location of the mobile telecommunications unit without a voice connection between the mobile unit and the originating unit being made. Such a system has many real world applications, such as verifying whether the user of the mobile unit is actually at a predetermined geographic location, or in determining the geographic location of the mobile unit in a case of theft, kidnaping, etc.

BRIEF DESCRIPTION OF THE DRAWINGS

The drawing block diagram of an embodiment of this system and method of the present invention.

BRIEF DESCRIPTION OF THE PREFERRED EMBODIMENTS

The drawings illustrates the system and method of the present invention. The geographic location provider system 10, in general, is made up of the components shown. In operation, an originating telecommunications unit 28, typically a land-based wired or wireless telephone, or a computer, places a call to a prespecified telephone number to initiate the location provider system 10 to determine the geographic location of a mobile telecommunications unit 20. Mobile unit 20 is typically a wireless telephone, a computer, or any other device capable of wireless telecommunications with a wireless serving switch 22. The originating unit 28 then provides an authorization code, or other authorization data, which is transmitted to a public switching telephone network 26 and on to a service platform 24. The originating unit 28 user also provides the telephone number, or other identification, of the mobile unit 20 to be located.

Receipt by the service platform 24 of the authorization code and mobile unit phone number information prompts the service platform 24 to initiate a program which attempts to geographically locate the position of the mobile unit 20 and to provide that information to originating unit 28. The originating unit 28 does not actually initiate a telecommunications message, i.e. a telephone call, to the mobile unit 20 to determine the geographic location of the mobile unit 20. However, mobile unit 20 must be powered-on during the location provider process.

Service platform 24 performs a lookup in a data base to provide the originating unit 28 with the geographic location of mobile unit 20. Service platform 24 delivers this information to originating unit 28 either by voice prompts, or by electronic messaging such as Short Message Service (SMS) or Cellular Digital Packet Data (CDPD) protocols.

Various devices and means may be employed to provide the geographic location of mobile unit 20 to the originating unit 28. In particular, a geographic location provider device 32 provides service platform 24 directly, or indirectly through wireless serving switch 22, with the geographic location data. Location provider device 32 may be a spacebased satellite platform, such as a GPS system, or any other satellite system which functions to geographically pinpoint an object on the earth using various known methods. The location provider device may be located on the mobile unit 20. Alternatively, other devices which may function as the location provider device 32 are a device which performs triangulation calculations to determine the geographic location of mobile unit 20, a device which utilizes distance delay calculations such as round-trip-delay to determine that geographic location, or a device which determines which cell among a plurality of cells is receiving the strongest signal from the mobile unit 20. Service platform 24 may also send a short message or page signal to mobile unit 20 without actually placing a call to mobile unit 20. In this manner, mobile unit 20 may itself provide service platform 24 with information regarding its own geographic location or the service platform may deduce the geographic location of the mobile unit by one or more of the techniques described above.

Thus, the user of mobile unit 20 is unaware that the user of originating unit 28 is attempting to determine the geographic location of the mobile unit 20. Various uses should come to mind, for example, using mobile unit 20 as a tracking device for an individual, a vehicle, etc. As long as the mobile unit 20 is powered-on, its location can be automatically determined after the proper authorization code and mobile unit ID information are provided by originating unit 28.

The message protocol 30 between wireless serving switch 22 and service platform 24 is typically a common telecommunications standard such as CTIA IS-41 or ITU GSM MAP. The wireless communication protocol 34 between mobile unit 20 and wireless serving switch 22 may be a standard such as AMPS, TDMA/CDMA or GSM.

The foregoing disclosure and description of the invention are illustrative and explanatory of the preferred embodiments. Changes in the size, shape, materials, elements and individual components used, the connections made, or other construction, may be made without departing from the spirit and scope of the inventions herein claimed.

What is claimed is:

1. A method of providing an originating telecommunications unit with the geographic location of a mobile telecommunications unit without communicating with the mobile telecommunications unit between issuance of a request for the geographic location of the mobile telecommunications unit and transmission of the geographic location of the mobile telecommunications unit to the originating telecommunications unit, comprising the steps of:

providing a serving switch coupled to the mobile telecommunications unit;

providing a service platform coupled to the serving switch, the service platform communicating with the mobile telecommunications unit through the serving switch;

providing, at the mobile telecommunications unit, a location provider device, the location provider device directly coupled to the service platform independent of the coupling between the mobile telecommunications unit and the service platform through the serving switch;

receiving, at the service platform, a signal, from the mobile telecommunications unit, from which the geographic location of the mobile telecommunications unit may be determined, the mobile telecommunications unit transferring the signal directly to the service platform via the direct coupling between the mobile telecommunications unit and the service platform independent of the coupling between the mobile telecommunications unit and the service platform through the serving switch;

determining, at the service platform, the geographic location of the mobile telecommunications unit;

maintaining, at the service platform, the determined geographic location of the mobile telecommunications unit;

establishing a connection between the originating telecommunications unit and the service platform;

upon establishing the connection between the originating telecommunications unit and the service platform, the originating telecommunications unit transmitting, to the service platform, a telephone number of the mobile telecommunications unit for which the geographic location is desired and an authorization code for authorizing the service platform to transfer the geographic location of the mobile terminal which is maintained at the service platform;

receiving, at the service platform, the telephone number of the mobile telecommunications unit for which the geographic location is desired and the authorization code for authorizing the service platform to transfer the geographic location of the mobile telecommunications unit;

in response to receipt of the telephone number and the authorization code, the service platform performing a look-up in a data base to obtain the geographic location of the mobile telecommunications unit and providing, to the originating telecommunications unit, the geographic location of the mobile telecommunications unit maintained by the service platform without further communications between the service platform and the mobile telecommunications unit, and upon providing the originating telecommunications unit with the geographic location of the mobile telecommunications terminal, the service platform providing the originating telecommunication unit with an option to request, from the service platform, an update to the provided geographic location of the mobile telecommunications unit.

2. The method of claim 1, wherein the geographic location is first provided to the service platform by a geographic location provider prior to the geographic information being provided to the originating telecommunications unit.

3. The method of claim 1, wherein the geographic information is ascertained by a space-based satellite platform.

4. The method of claim 1, wherein the geographic information is ascertained by a device which performs at least one triangulation calculation.

5. The method of claim 1, wherein the geographic information is ascertained by a device which performs at least one distance delay calculation.

6. A method of providing an originating telecommunications unit with the geographic location of a mobile telecommunications unit, comprising the steps of:

providing a serving switch coupled to the mobile telecommunications unit;

providing a service platform coupled to the serving switch, the service platform communicating with the mobile telecommunications unit through the serving switch;

providing, at the mobile telecommunications unit, a location provider device, the location provider device directly coupled to the service platform independent of the coupling between the mobile telecommunications unit and the service platform through the serving switch;

receiving, from the mobile telecommunications unit, a signal from which the geographic location of the mobile telecommunications unit may be determined, the mobile telecommunications unit transferring the signal directly to the service platform via the direct coupling between the mobile telecommunications unit and the service platform independent of the coupling between the mobile telecommunications unit and the service platform through the serving switch;

maintaining, at the service platform, the geographic location of the mobile telecommunications unit;

receiving, at the service platform, an authorization code transmitted by the originating telecommunications unit; and in response to receipt of the authorization code, the service platform providing, to the originating telecommunications unit, information representing the geographic location of the mobile telecommunications unit without further communications between the service platform and the mobile telecommunications unit.

7. A method of providing an originating telecommunications unit with the geographic location of a mobile telecommunications unit, comprising the steps of:

providing a serving switch coupled to the mobile telecommunications unit;

providing a service platform coupled to the serving switch, the service platform communicating with the mobile telecommunications unit through the serving switch;

providing a location provider device for determining the location of the mobile telecommunications unit, the location provider device coupled directly to the serving platform independent of the coupling between the mobile telecommunications unit and the service platform through the service switch;

receiving, at the service platform, a signal from which the geographic location of the mobile telecommunications unit may be determined, the location provider device transmitting the signal to the service platform via the direct coupling between the mobile telecommunications unit and the serving platform through the service switch;

receiving, at the service platform, an authorization code transmitted by the originating telecommunications unit; and in response to receipt of the authorization code, the service platform providing, to the originating telecommunications unit, information representing the geographic location of the mobile telecommunications unit.

* * * * *

UNITED STATES PATENT AND TRADEMARK OFFICE
CERTIFICATE OF CORRECTION

PATENT NO. : 6,091,957
DATED : July 18, 2000
INVENTOR(S) : John Pruett Larkins and Gary Boyd Stephens It is certified that error appears in the above-identified patent and that said Letters Patent is hereby corrected as shown below:

Coulumn 5,
Line 18, replace "serving" with -- service --

Column 6,
Line 2, replace "service" with -- serving --
Line 8, replace "serving" with -- service --

Signed and Sealed this

Ninth Day of July, 2002

Attest:

Attesting Officer

JAMES E. ROGAN
Director of the United States Patent and Trademark Office